(12) United States Patent
Momoi

(10) Patent No.: US 12,212,192 B2
(45) Date of Patent: Jan. 28, 2025

(54) DRIVE UNIT AND ELECTRIC VEHICLE

(71) Applicant: YAMAHA HATSUDOKI KABUSHIKI KAISHA, Iwata (JP)

(72) Inventor: Masayuki Momoi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 293 days.

(21) Appl. No.: 17/864,601

(22) Filed: Jul. 14, 2022

(65) Prior Publication Data

US 2023/0026158 A1    Jan. 26, 2023

(30) Foreign Application Priority Data

Jul. 20, 2021   (JP) .................. 2021-119984

(51) Int. Cl.

| H02K 11/30 | (2016.01) |
|---|---|
| B60L 15/20 | (2006.01) |
| H02K 5/04 | (2006.01) |
| H02K 7/00 | (2006.01) |
| H02K 7/08 | (2006.01) |
| F16H 57/02 | (2012.01) |

(52) U.S. Cl.
CPC .............. *H02K 11/30* (2016.01); *B60L 15/20* (2013.01); *H02K 5/04* (2013.01); *H02K 7/003* (2013.01); *H02K 7/08* (2013.01); *F16H 2057/02034* (2013.01)

(58) Field of Classification Search
CPC .......... H02K 11/30; H02K 7/003; H02K 7/08; H02K 5/04; H02K 2211/03; H02K 5/161; H02K 5/22; H02K 11/33; F16H 2057/02034; B60L 15/20; Y02T 10/64
See application file for complete search history.

(56) References Cited

U.S. PATENT DOCUMENTS

| 6,624,610 B1 | 9/2003 | Ono et al. |
|---|---|---|
| 8,604,655 B1 | 12/2013 | Ferran |
| 2005/0006963 A1 | 1/2005 | Takenaka et al. |
| 2011/0200467 A1 | 8/2011 | Cho et al. |

(Continued)

FOREIGN PATENT DOCUMENTS

| CN | 110011458 A * | 7/2019 | ............... B60K 1/00 |
|---|---|---|---|
| EP | 3 937 353 A1 | 1/2022 | |

(Continued)

OTHER PUBLICATIONS

CN110011458A English translation (Year: 2024).*

(Continued)

*Primary Examiner* — Christopher M Koehler
*Assistant Examiner* — Viswanathan Subramanian
(74) *Attorney, Agent, or Firm* — Keating & Bennett, LLP

(57) ABSTRACT

A drive unit includes an electric motor, an MCU to supply a driving current to the electric motor, and a bracket fixing the MCU to the electric motor with a gap between the MCU and the electric motor. The electric motor includes a stator case accommodating a stator, a first housing including a bearing that supports one side of an output shaft of a rotor, and a second housing including a bearing that supports another side of the output shaft of the rotor. The bracket supporting the MCU is attached to the first housing and the second housing and not to the stator case.

7 Claims, 13 Drawing Sheets

(56) References Cited

U.S. PATENT DOCUMENTS

| | | |
|---|---|---|
| 2013/0119834 A1 | 5/2013 | Nakagami et al. |
| 2015/0061422 A1 | 3/2015 | Nagao et al. |
| 2016/0126808 A1 | 5/2016 | Nagao et al. |
| 2018/0358863 A1* | 12/2018 | Tanie .................. H02K 1/2766 |
| 2019/0118634 A1 | 4/2019 | Ito |
| 2020/0212755 A1 | 7/2020 | Okuhata et al. |

FOREIGN PATENT DOCUMENTS

| | | | |
|---|---|---|---|
| JP | 09-182352 A | 7/1997 | |
| JP | 2000-253591 A | 9/2000 | |
| JP | 2019-077355 A | 5/2019 | |
| WO | WO-2020043456 A1 * | 3/2020 | ............. H02K 23/68 |
| WO | 2020/187314 A1 | 9/2020 | |

OTHER PUBLICATIONS

WO2020043456A1 English translation (Year: 2024).*
Official Communication issued in corresponding European Patent Application No. 22186015.8, mailed on Dec. 2, 2022.

* cited by examiner

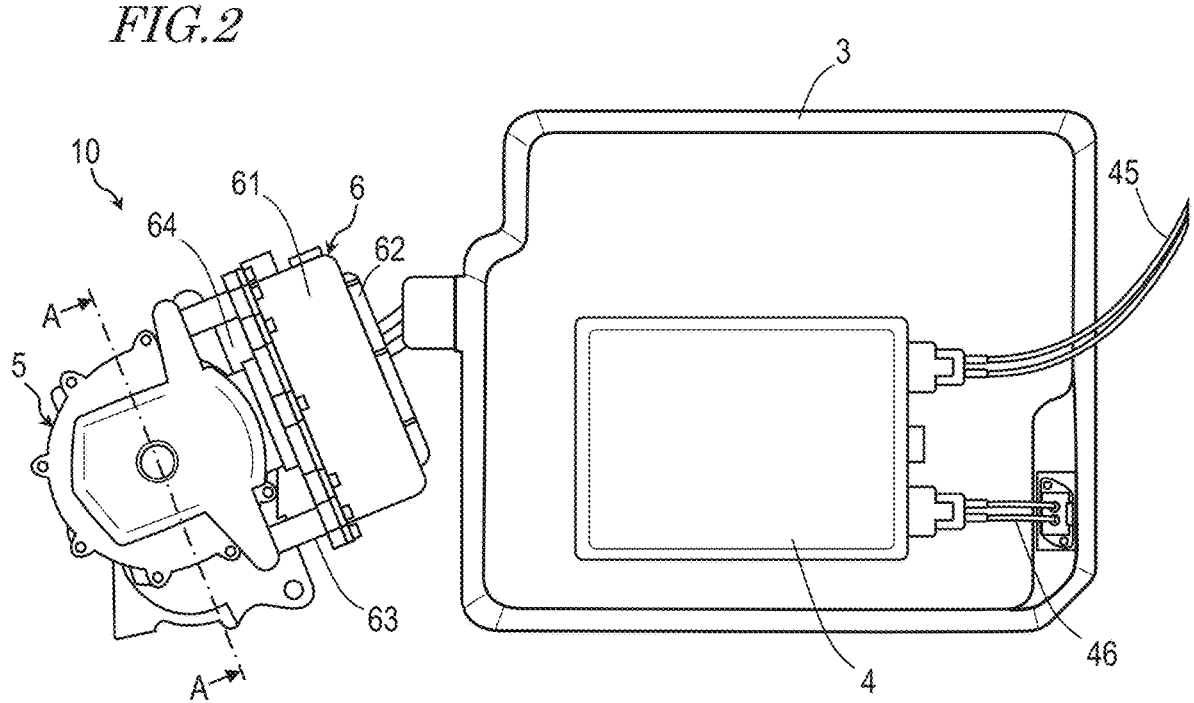
FIG.2
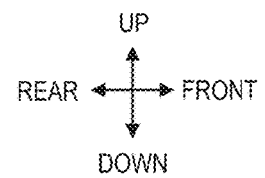

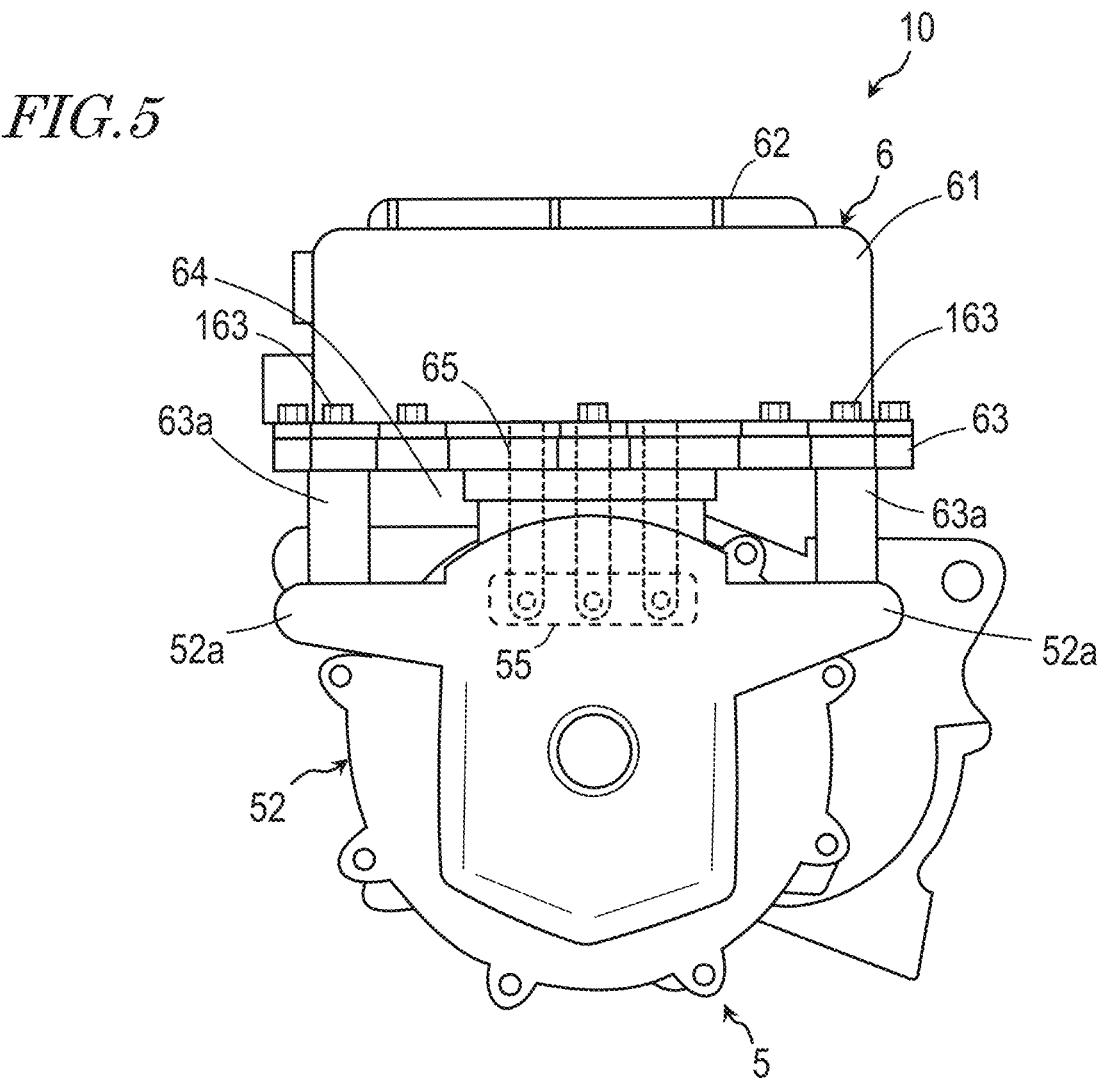
FIG.5
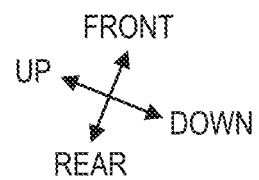

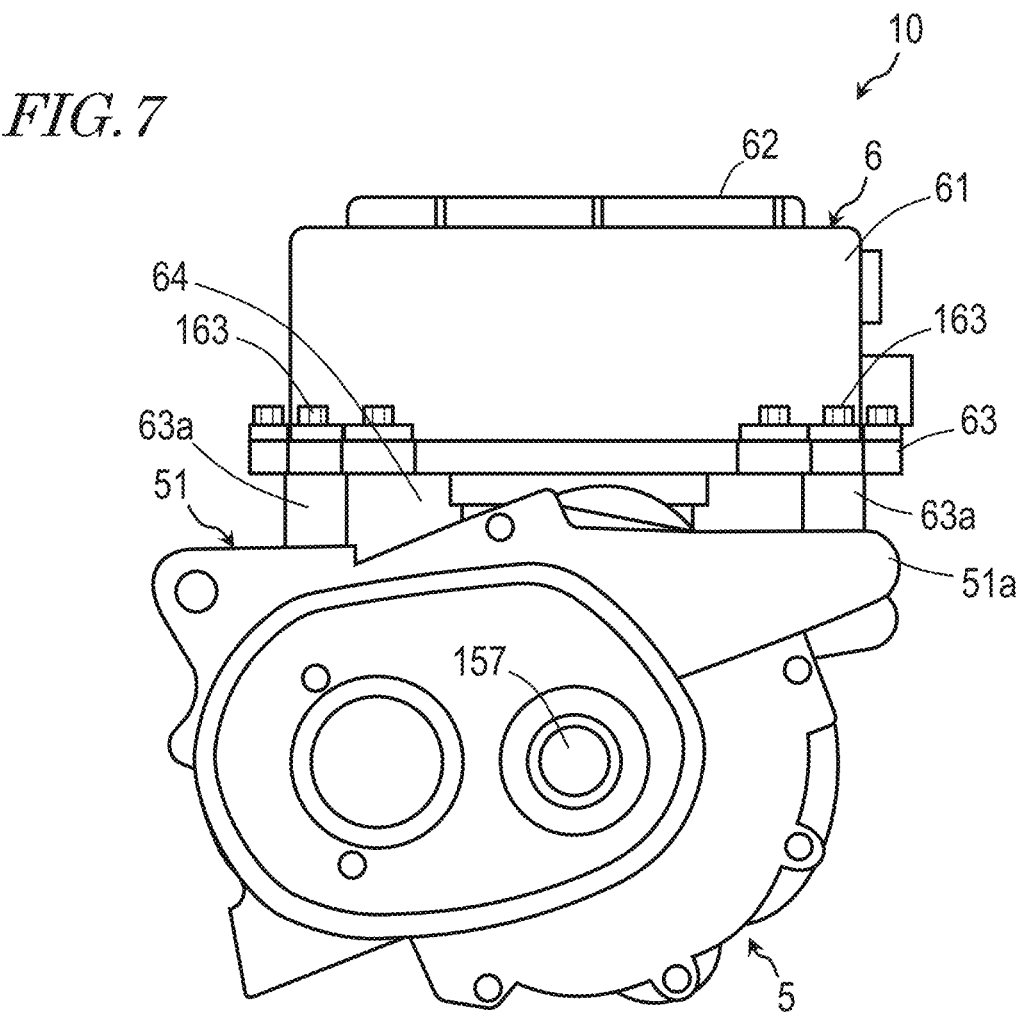
FIG.7
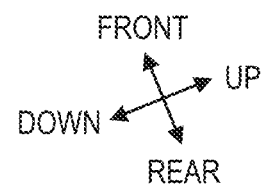

DRIVE UNIT AND ELECTRIC VEHICLE

CROSS REFERENCE TO RELATED APPLICATIONS

This application claims the benefit of priority to Japanese Patent Application No. 2021-119984 filed on Jul. 20, 2021. The entire contents of this application are hereby incorporated herein by reference.

BACKGROUND OF THE INVENTION

1. Field of the Invention

The present invention relates to a drive unit including an electric motor, and an electric vehicle including such a drive unit.

2. Description of the Related Art

There are electric vehicles that travel using an electric motor as their driving source (see, for example, Japanese Laid-Open Patent Publication No. 2000-253591). The electric motor rotates due to electric power which is supplied from a battery installed in such an electric vehicle. As the rotation of the electric motor is transmitted to the wheels, the electric vehicles can travel.

One possible drive unit to be mounted in an electric vehicle is a drive unit having an integrated mechanical and electrical structure in which an electric motor and a controller that controls operation of the electric motor are integrated. With an integrated mechanical and electrical structure in which the controller is attached to the electric motor, any high-voltage wiring between the controller and the electric motor can be shortened, thus enabling cost and weight reductions.

On the other hand, such an integrated mechanical and electrical structure has a problem in that heat generated from the electric motor is likely to be transmitted to the controller.

SUMMARY OF THE INVENTION

Preferred embodiments of the present invention provide drive units in each of which an amount of heat that is transmitted from an electric motor to a controller is reduced, and electric vehicles including such drive units.

A drive unit according to a preferred embodiment of the present invention includes an electric motor, a controller to supply a driving current to the electric motor, and a bracket fixing the controller to the electric motor with a gap between the controller and the electric motor, wherein the electric motor includes a stator, a stator case accommodating the stator, a rotor including an output shaft and located inside the stator, a first housing including a bearing that supports one side of the output shaft along a rotation axis direction of the rotor, the first housing being attached to the stator case so as to cover an opening at one end of the stator case, and a second housing including a bearing that supports another side of the output shaft along the rotation axis direction, the second housing being attached to the stator case so as to cover an opening at another end of the stator case, and the bracket is attached to the first housing and the second housing and not to the stator case.

During operation of the electric motor, a lot of heat is generated from the stator which includes coils and iron cores. Thus, the main source of heat within the electric motor is the stator. The heat generated from the stator is mainly transmitted to the stator case and released outside the electric motor.

A drive unit according to a preferred embodiment of the present invention includes an integrated mechanical and electrical structure in which the controller is attached to the electric motor. The bracket is attached to the first and second housings supporting the bearings and not to the stator case. Because the gap exists between the controller and the electric motor and because the controller is attached to the first and second housings, the amount of heat that is transmitted from the stator to the controller is reduced.

The first and second housings may be used in common among multiple models of the electric motor which differ in length along the rotation axis direction. Changes in the size of the electric motor are achieved by changing the length of the stator case along the rotation axis direction. By merely changing the size of the bracket in accordance with the length along the rotation axis direction of each of the multiple models, it becomes possible to realize an integrated mechanical and electrical structure in each model.

According to a preferred embodiment of the present invention, the stator case may be made of a stretched material.

By varying the dimensions into which the stretched material is cut, multiple models of the electric motor which differ in length along the rotation axis direction are easily obtained. Thus, it becomes possible to reduce the costs associated with producing a wide variety of products in small quantities.

According to a preferred embodiment of the present invention, the drive unit may further include a busbar through which the driving current supplied from the controller flows to the electric motor, wherein the busbar is connected to one of the first housing and the second housing of the electric motor.

Because the busbar(s) is connected to only one of the opposite ends of the electric motor, a common connection structure for the busbar(s) may be used among multiple models of the electric motor which differ in length along the rotation axis direction. The shape of the bracket at the side of the electric motor where the busbar(s) is not connected may be changed from model to model, such that the structure at the side where the busbar(s) is connected is able to be kept in common among the multiple models.

According to a preferred embodiment of the present invention, a gap is provided between the controller and the stator case along a direction perpendicular or substantially perpendicular to the rotation axis direction.

This allows the size of the drive unit along the rotation axis direction to be reduced.

According to a preferred embodiment of the present invention, at least one of the first housing or the second housing may include a protrusion that protrudes away from the stator case, and the bracket may be attached to the protrusion.

This allows the bracket to be attached to the electric motor at a location farther away from the stator, thus reducing the amount of heat that is transmitted to the controller via the bracket.

According to a preferred embodiment of the present invention, the drive unit may further include a speed reducer to increase a torque generated by the electric motor, and the speed reducer may be provided on one of the first housing and the second housing of the electric motor.

By increasing the torque with the speed reducer, a large torque is able to be output. Because the speed reducer is provided on only one of the opposite ends of the electric motor, a common speed reducer can be used among multiple models of the electric motor which differ in length along the rotation axis direction. The shape of the electric motor at the side where the speed reducer is not provided may be changed from model to model, such that the structure at the side where the speed reducer is provided is able to be kept in common among the multiple models.

An electric vehicle according to a preferred embodiment of the present invention includes the above-described drive unit.

Thus, an electric vehicle in which a reduced amount of heat is transmitted to the controller is realized. Moreover, multiple vehicle models which differ with respect to the electric motor size may be obtained at low costs.

During operation of the electric motor, a lot of heat is generated from the stator which includes coils and iron cores. Thus, the main source of heat within the electric motor is the stator. The heat generated from the stator is mainly transmitted to the stator case and released outside the electric motor.

A drive unit according to a preferred embodiment of the present invention includes an integrated mechanical and electrical structure in which the controller is attached to the electric motor. The bracket is attached to the first and second housings supporting the bearings and not to the stator case. Because the gap exists between the controller and the electric motor and because the controller is attached to the first and second housings, the amount of heat that is transmitted from the stator to the controller is reduced.

The first and second housings may be used in common among multiple models of the electric motor which differ in length along the rotation axis direction. Changes in the size of the electric motor are achieved by changing the length of the stator case along the rotation axis direction. By merely changing the size of the bracket in accordance with the length along the rotation axis direction of each of the multiple models, it becomes possible to realize an integrated mechanical and electrical structure in each model.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a right side view showing a battery 3, an onboard charger 4, and a drive unit 10 according to a preferred embodiment of the present invention.

FIG. 5 is a right side view showing a drive unit 10 according to a preferred embodiment of the present invention.

FIG. 7 is a left side view showing a drive unit 10 according to a preferred embodiment of the present invention.

FIG. 12 is a diagram showing an electric motor 5 whose first housing 51 lacks a protrusion 51a.

FIG. 13 is a diagram showing an electric motor 5 whose second housing 52 lacks a protrusion 52a.

DETAILED DESCRIPTION OF THE PREFERRED EMBODIMENTS

Figure 1:
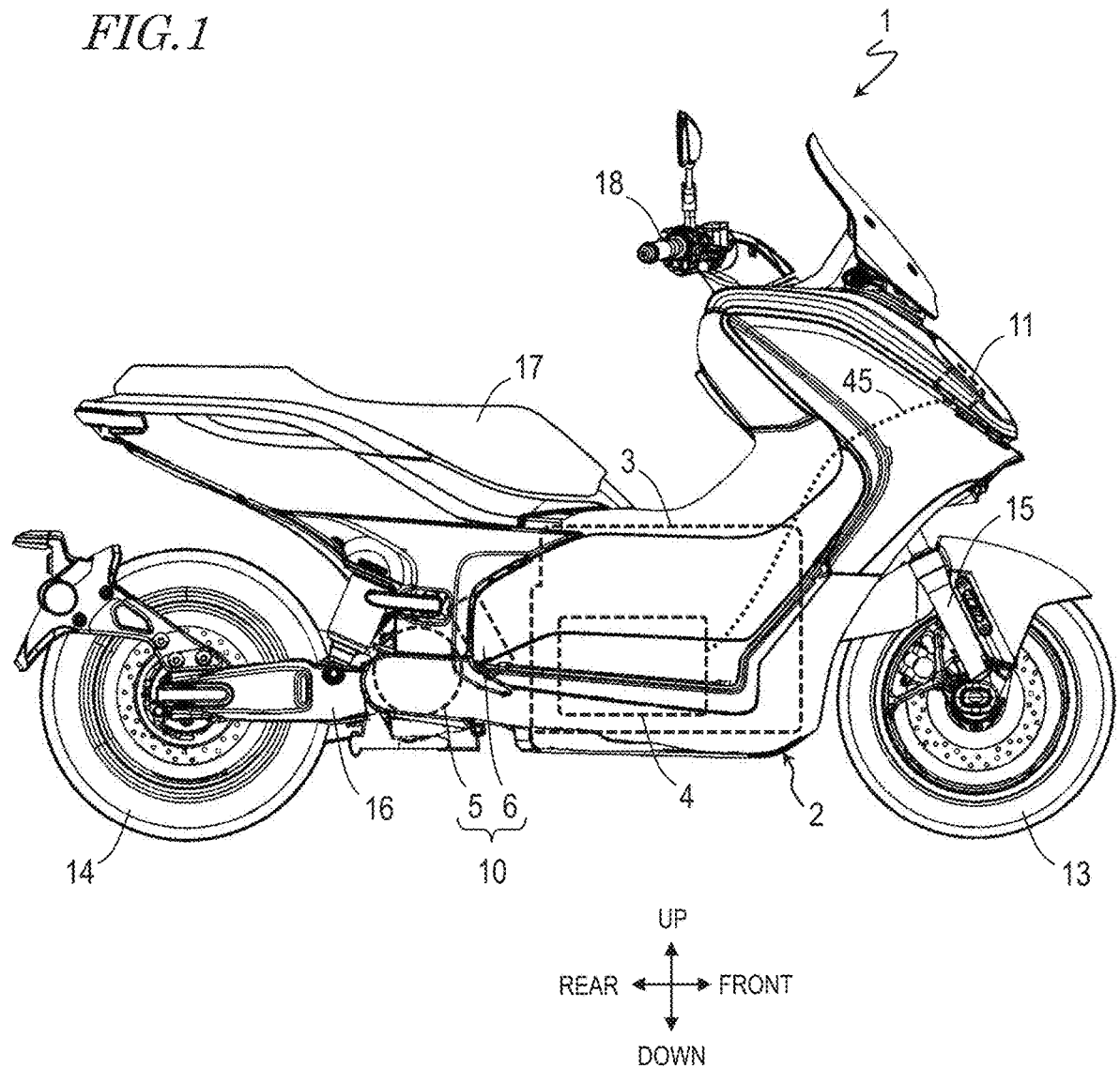
FIG. 1 is a right side view showing an electric vehicle 1 according to a preferred embodiment of the present invention.

Hereinbelow, with reference to the attached drawings, preferred embodiments of the present invention are described. Like components are denoted by like reference numerals, and redundant description of such components is omitted. In the following description, the front, rear, top, bottom, right, and left correspond respectively to the front, rear, top, bottom, right, and left as viewed from a rider seated on a seat of an electric vehicle. Note that the preferred embodiments described hereinbelow are merely examples, and thus the present invention is not limited to the preferred embodiments described below.

FIG. 1 is a right side view showing an electric vehicle 1 according to a preferred embodiment of the present invention. The electric vehicle 1 may be a straddled electric vehicle, for example. In the example illustrated in FIG. 1, the electric vehicle 1 is a two-wheeled electric vehicle of a scooter type. Note that the electric vehicle 1 is not limited to the scooter-type two-wheeled electric vehicle exemplified herein. The electric vehicle 1 may be two-wheeled electric vehicles of other types such as what is called an on-road type, an off-road type, and a moped type. A straddled electric vehicle refers to an arbitrary vehicle that the rider rides in a straddling manner, and thus is not limited to two-wheeled vehicles. The straddled electric vehicle 1 may be a three-wheeled vehicle (LMW) of a type whose direction of travel is changed as the vehicle body is tilted, etc., or any other straddled electric vehicle such as an ATV (All Terrain Vehicle). The electric vehicle 1 may be a vehicle with four or more wheels.

As shown in FIG. 1, the two-wheeled electric vehicle 1 includes a vehicle body 2, a battery 3, an onboard charger 4, a drive unit 10, a front wheel 13, a rear wheel 14, and steering handles 18.

The vehicle body 2 has a structure including a body frame and a body cover. A front portion of the vehicle body 2 supports front forks 15. The steering handles 18 are attached to an upper portion of the front forks 15. The front wheel 13 is rotatably supported at lower end portions of the front forks 15. A rear portion of the vehicle body 2 swingingly supports a swingarm 16. The rear wheel 14 is rotatably supported by the swingarm 16. In this example, the rear wheel 14 is a drive wheel, and the front wheel 13 is a driven wheel. A seat 17 on which the rider is seated is provided at an upper portion of the vehicle body 2.

The battery 3 is between the front wheel 13 and the rear wheel 14 along the front-rear direction of the vehicle 1. The drive unit 10 is rearward of the battery 3. The drive unit 10 includes an electric motor 5 and a motor control unit (MCU) 6 that controls operation of the electric motor 5. The battery 3 supplies electric power to activate the electric motor 5. The MCU 6 generates a driving current from an output current of the battery 3, and outputs this driving current to the electric motor 5. Rotation caused by the electric motor 5 is transmitted to the rear wheel 14 via, for example, a motive power transmission mechanism of, for example, a belt-drive type to cause the two-wheeled electric vehicle 1 to travel. The rotation caused by the electric motor 5 may be transmitted to the rear wheel 14 via a motive power transmission mechanism of a chain-drive type or a shaft-drive type.

The onboard charger 4 is to the right of the battery 3. FIG. 2 is a right side view showing the battery 3, the onboard charger 4, and the drive unit 10. With reference to FIG. 1, a charging port 11 is provided in the front portion of the vehicle body 2. A connector that is provided on a cable extending from an external power source is attachable to or detachable from the charging port 11. The charging port 11 is connected to the onboard charger 4 via a harness 45. When charging the battery 3, an AC current output from the external power source is supplied to the onboard charger 4 through the charging port 11. The onboard charger 4 converts the AC current to DC current, and outputs the DC current to the battery 3 to charge the battery 3. The DC current output by the onboard charger 4 is supplied to the battery 3 via, for example, electric wires 46 (FIG. 2). Alternatively, the charging port 11 may have DC current supplied thereto from an external power source. In this case, the onboard charger 4 converts an input voltage to a DC voltage that is suitable to charge the battery 3, and outputs this DC voltage to the battery 3.

Next, the drive unit 10 will be described. The drive unit 10 according to the present preferred embodiment has an integrated mechanical and electrical structure in which the MCU 6 is attached to the electric motor 5. In the example shown in FIG. 2, the MCU 6 is attached to the electric motor 5 via a bracket 63. With the integrated mechanical and electrical structure, the high-voltage wiring between the MCU 6 and the electric motor 5 is shortened, thus enabling cost and weight reductions.

Figure 3:
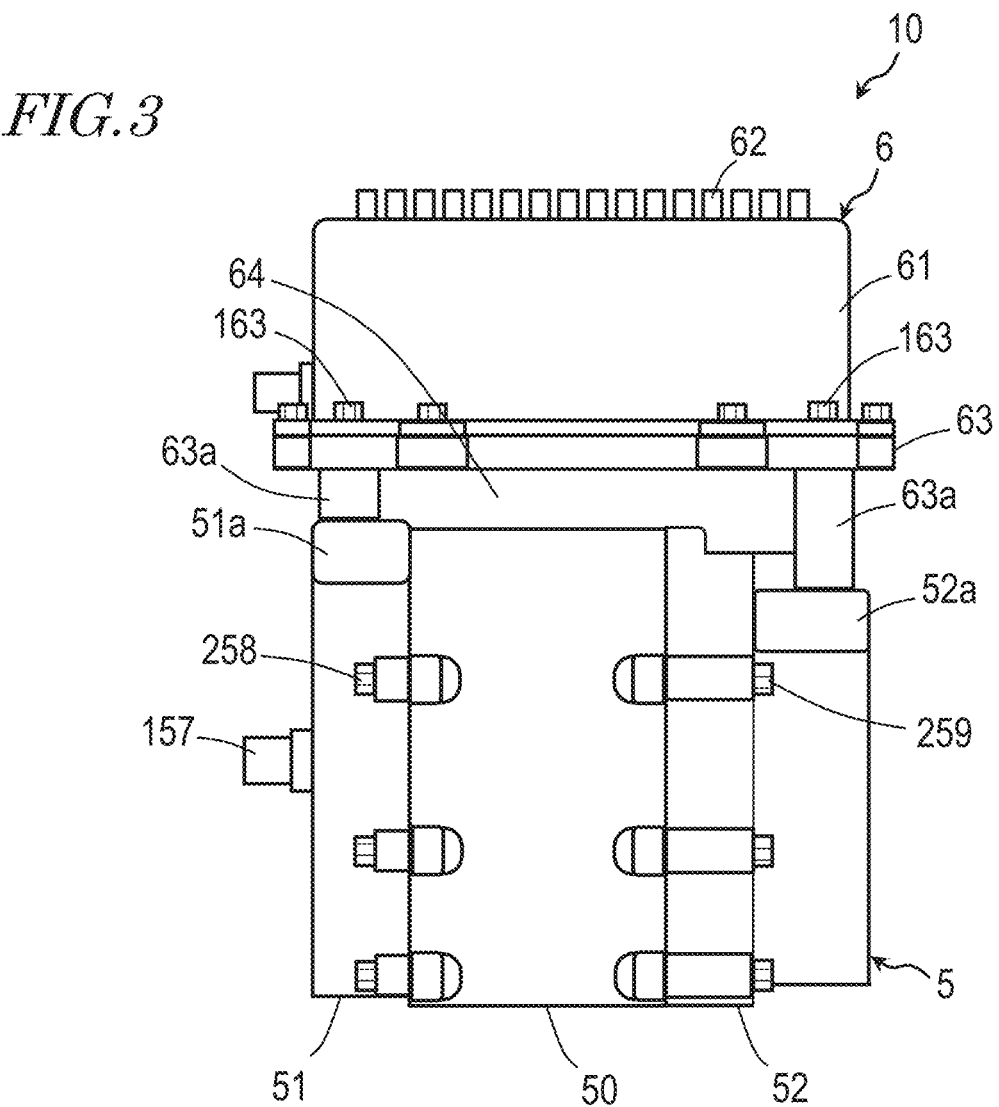
FIG. 3 is a diagram showing the drive unit 10 as viewed from obliquely above and rearward according to a preferred embodiment of the present invention.
Figure 3:
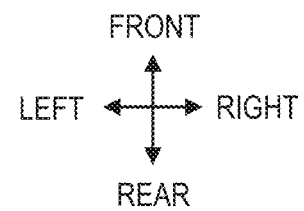
Figure 4:
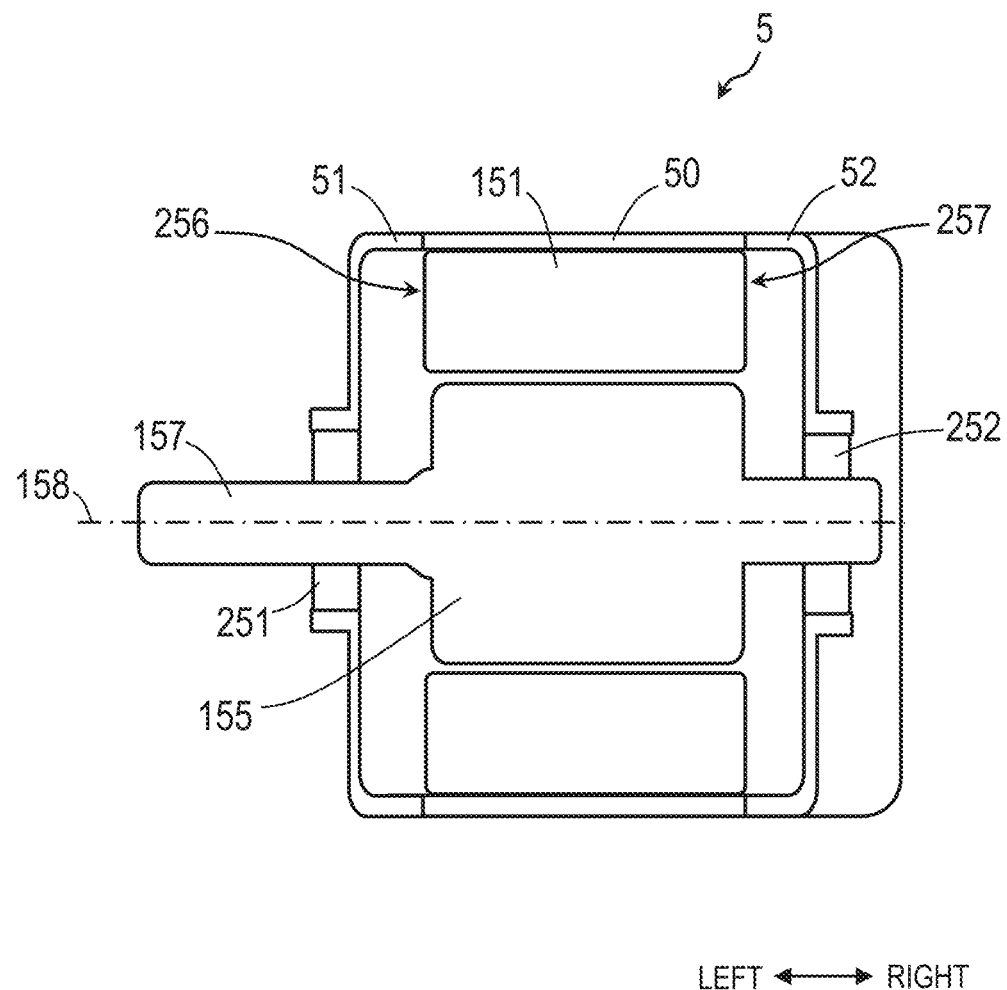
FIG. 4 is a schematic diagram showing a cross section of an electric motor 5 according to a preferred embodiment of the present invention.

FIG. 3 is a diagram showing the drive unit 10 as viewed from obliquely above and rearward. For ease of explanation, the top-bottom direction in the plane of the figure of FIG. 3 is assumed to be the front-rear direction. FIG. 4 is a schematic diagram showing a cross section of the electric motor 5 taken along line A-A in FIG. 2. The electric motor 5 may be a permanent magnet synchronous motor, for example, but is not limited thereto.

With reference to FIG. 4, the electric motor 5 includes a stator 151 and a barrel-shaped stator case 50 accommodating the stator 151. The stator 151 includes a plurality of bobbins with a coil wound around each of them, with an iron core inserted in each bobbin. The stator case 50 may be made of a metal material such as an aluminum alloy, for example. The outer periphery of the stator 151 is fixed to the inner periphery of the stator case 50.

The electric motor 5 further includes a rotor 155, a first housing 51, and a second housing 52. The rotor 155 is located inside the stator 151. On the outer periphery of the rotor 155, permanent magnets are provided so that their N poles and S poles alternate along the circumferential direction. The rotor 155 includes an output shaft 157, and is capable of rotating around an axis of rotation 158.

The first housing 51 is attached to the stator case 50 so as to cover an opening 256 at one end of the barrel-shaped stator case 50. The first housing 51 is fixed to the stator case 50 by using fastening members 258 (FIG. 3) such as bolts. The second housing 52 is attached to the stator case 50 so as to cover an opening 257 at another end of the barrel-shaped stator case 50. The second housing 52 is fixed to the stator case 50 by using fastening members 259 (FIG. 3) such as bolts. The stator case 50, the first housing 51, and the second housing 52 are separate elements. The first housing 51 and the second housing 52 may be made of a metal material such as an aluminum alloy, for example. The first housing 51 and the second housing 52 may be referred to as a bracket or an endbell.

On the first housing 51, a bearing 251 supporting one side of the output shaft 157 along the rotation axis direction of the rotor 155 is provided. On the second housing 52, a bearing 252 supporting the other end of the output shaft 157 along the rotation axis direction of the rotor 155 is provided. The output shaft 157 is rotatably supported by the two bearings 251 and 252. The output shaft 157 extends through the first housing 51.

With reference to FIG. 3, the bracket 63 supports the MCU 6. The bracket 63 may be made of a metal material such as an aluminum alloy, for example. Radiation fins 62 are provided at a front portion of the housing 61 of the MCU 6. The rear portion of the housing 61 is fixed to the bracket 63 by using fastening members such as bolts. The bracket 63 includes a plurality of pillars 63*a* extending in the direction of the electric motor 5, which fix the MCU 6 to the electric motor 5 so that a gap 64 exists between the MCU 6 and the electric motor 5. The pillars 63*a* of the bracket 63 are fixed to the electric motor 5 by using fastening members 163 such as bolts. In the present preferred embodiment, the pillars 63*a* of the bracket 63 are attached not to the stator case 50 but to the first housing 51 and the second housing 52.

Figure 6:
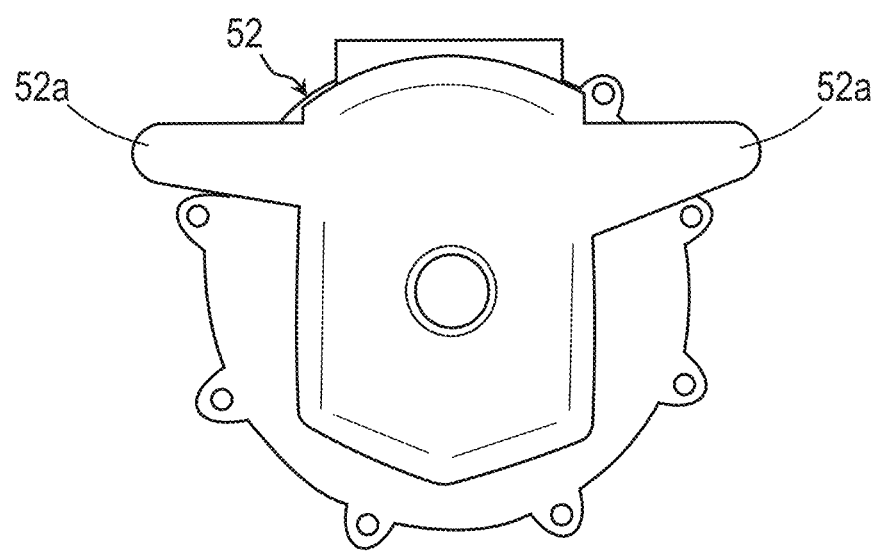
FIG. 6 is a right side view showing a second housing 52 according to a preferred embodiment of the present invention.
Figure 6:
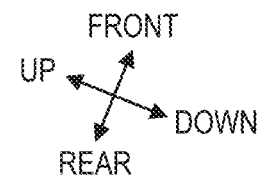
Figure 8:
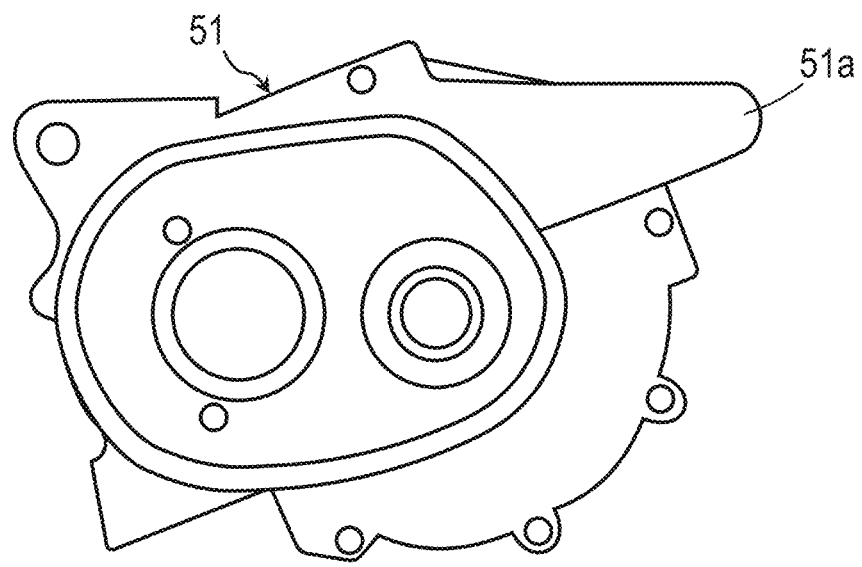
FIG. 8 is a left side view showing a first housing 51 according to a preferred embodiment of the present invention.
Figure 8:
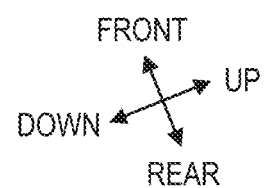

FIG. 5 is a right side view showing the drive unit 10, FIG. 6 is a right side view showing the second housing 52, FIG. 7 is a left side view showing the drive unit 10, and FIG. 8 is a left side view showing the first housing 51.

With reference to FIG. 7 and FIG. 8, the first housing 51 includes a protrusion 51*a* which protrudes away from the stator case 50 in a plane perpendicular or substantially perpendicular to the axis of rotation of the electric motor 5. With reference to FIG. 5 and FIG. 6, the second housing 52 includes a protrusion 52*a* which protrudes away from the stator case 50 in a plane perpendicular or substantially perpendicular to the axis of rotation of the electric motor 5. The pillars 63*a* of the bracket 63 are attached to the protrusions 51*a* and 51*b*.

With reference to FIG. 4, during operation of the electric motor 5, a lot of heat is generated from the stator 151, which includes coils and iron cores. Thus, the main source of heat within the electric motor 5 is the stator 151. The heat generated from the stator 151 is mainly transmitted to the stator case 50 and released outside the electric motor 5.

In the drive unit 10 according to the present preferred embodiment, in an integrated mechanical and electrical structure in which the MCU 6 is attached to the electric motor 5, the bracket 63 supporting the MCU 6 is attached not to the stator case 50 but to the first housing 51 and the second housing 52. Because the gap 64 exists between the MCU 6 and the electric motor 5 and because the MCU 6 is attached to the first housing 51 and the second housing 52, the amount of heat that is transmitted from the stator 151 to the MCU 6 is reduced.

Moreover, the pillars 63*a* of the bracket 63 are attached to the protrusions 51*a* and 51*b*, which protrude away from the stator case 50. This allows the bracket 63 to be attached to the electric motor 5 at a location farther away from the stator 151, thus reducing the amount of heat that is transmitted to the MCU 6 via the bracket 63. Note that it may be only one of the first housing 51 and the second housing 52 that includes such a protrusion.

The MCU 6 is oriented so that the gap 64 exists between the MCU 6 and the stator case 50 along a direction perpendicular or substantially perpendicular to the rotation axis direction of the electric motor 5. This allows the size of the drive unit 10 along the rotation axis direction to be reduced.

The length of the gap 64 along the direction from the electric motor 5 toward the MCU 6 (i.e., the front-rear direction in FIG. 3) may be, e.g., about 5 mm to about 30 mm. These values are mere examples, and preferred embodiments of the present invention are not limited. In the case where the bracket 63 is located between the gap 64 and the MCU 6, the length of the gap 64 may be equal or substantially equal to the length of the gap between the electric motor 5 and the bracket 63.

The MCU 6 may include an inverter circuit, a DC-DC converter, and the like, and the MCU 6 itself also generates heat. When the temperature in the MCU 6 reaches a limit temperature or above, the MCU 6 may lower its output in order to reduce the generated heat. In the present preferred embodiment, the amount of heat that is transmitted from the electric motor 5 to the MCU 6 is reduced, such that the temperature in the MCU 6 is prevented from reaching the limit temperature or above. Moreover, since a temperature increase in the MCU 6 is significantly reduced, the number of switching elements included in the MCU 6 is able to be reduced, and a reduction in the cost of the MCU 6 is achieved. For example, in the inverter circuit of the MCU 6, a plurality of switching elements may be used in parallel connection in order to reduce the current flowing in each switching element. In the present preferred embodiment, since the amount of heat that is transmitted from the electric motor 5 to the MCU 6 is reduced, a greater amount of heat may be generated in each switching element meaning that a larger current may flow in each switching element, thus making it possible to reduce the number of switching elements.

The brackets 63 to attach the MCU 6 to the electric motor 5 may be monolithic, i.e., unitary, with the housing 61 of the MCU 6, or may be separate components from the housing 61.

Next, differentiation between multiple models of the electric motor 5 will be discussed.

Figure 9:
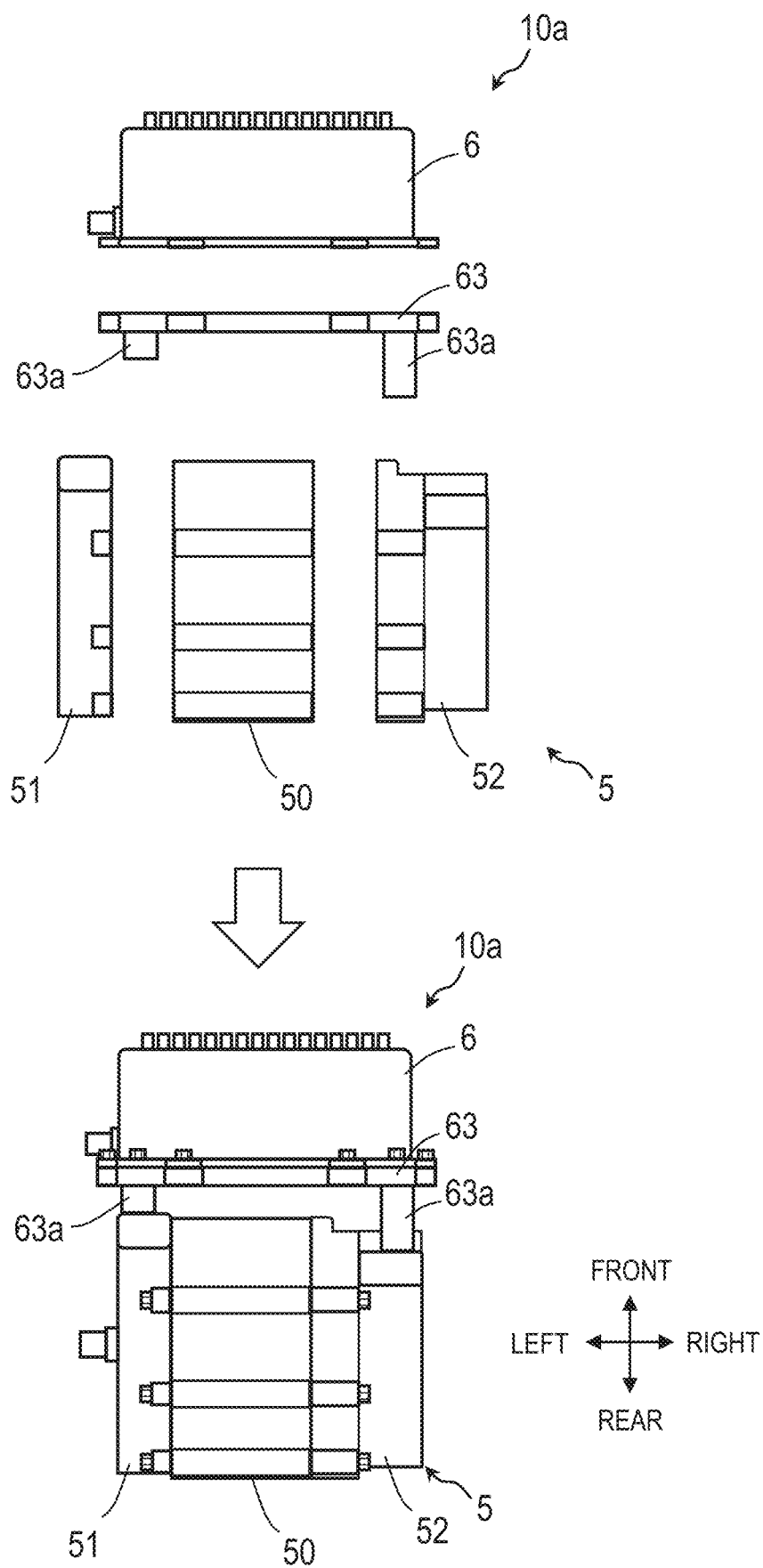
FIG. 9 is a diagram showing a drive unit 10a according to a preferred embodiment of the present invention.
Figure 10:
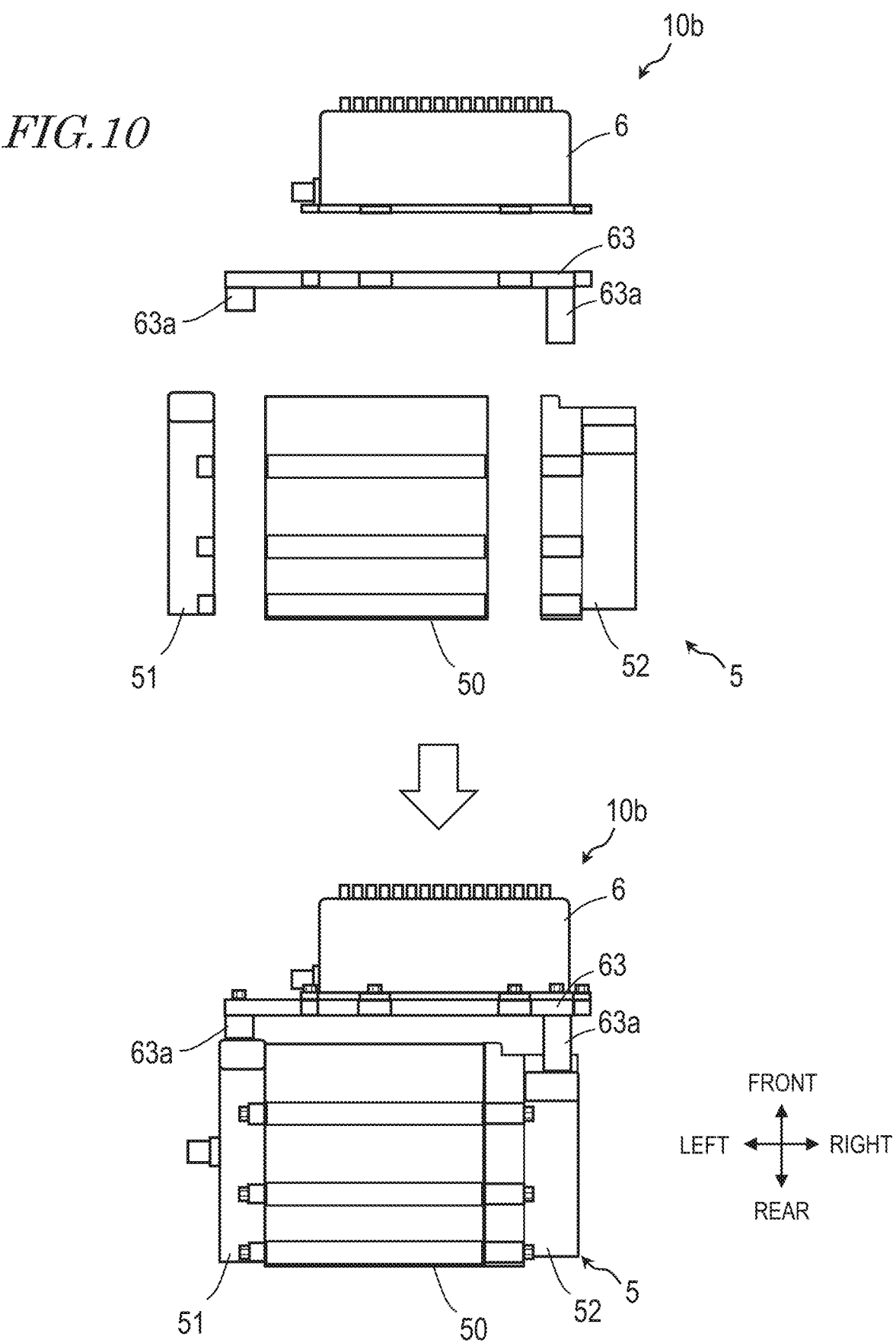
FIG. 10 is a diagram showing a drive unit 10b according to a preferred embodiment of the present invention.

FIG. 9 is a diagram showing a drive unit 10a according to a preferred embodiment of the present invention. FIG. 10 is a diagram showing a drive unit 10b according to a preferred embodiment of the present invention. The drive unit 10a and the drive unit 10b differ in length from each other along the rotation axis direction (the right-left direction) of the stator case 50 of the electric motor 5.

The stator case 50 of the electric motor 5 may be made of a stretched material. By varying the dimensions into which the stretched material is cut, multiple models of the electric motor 5 which differ in length along the rotation axis direction are easily obtained. A stretched material is a material that is shaped through processing such as extrusion, drawing, or the like, and generally allows the stator case 50 to be produced at a lower cost than by casting.

The first housing 51 and the second housing 52 may be used in common among such multiple models of the electric motor 5. Changes in the size of the electric motor 5 are achieved by changing the length of the stator case 50 along the rotation axis direction. By merely changing the size of the bracket 63 in accordance with the length along the rotation axis direction of each of the multiple models, it becomes possible to realize an integrated mechanical and electrical structure in each model.

Thus, by making the stator case 50 from a stretched material, it becomes possible to reduce the costs associated with producing a wide variety of products in small quantities in particular.

With reference to FIG. 5, busbars 65 extend from the MCU 6 towards the inside of the second housing 52. The busbars 65 are connected to a terminal base 55 in the electric motor 5. A three-phase AC driving current that is supplied from the MCU 6 to the electric motor 5 flows through the busbars 65.

In the present preferred embodiment, the busbars 65 are connected to the second housing 52, but not to the first housing 51 of the electric motor 5. Because the busbars 65 are connected to only one of the opposite ends of the electric motor 5 along the rotation axis direction, a common connection structure for the busbars 65 may be used among multiple models of the electric motor 5 which differ in length along the rotation axis direction. With reference to FIG. 9 and FIG. 10, the shape of the bracket 63 at the first housing 51 side (at which the busbars 65 of the electric motor 5 are not connected) may be changed from model to model (e.g., the length of the bracket 63 along the rotation axis direction may be changed), such that the structure at the second housing 52 (to which the busbars 65 are connected) are able to be kept in common among the multiple models.

Alternatively, the busbars 65 may extend towards the inside of the first housing 51, and not the second housing 52. In this case, the shape of the bracket 63 at the second housing 52 side may be changed from model to model, such that the structure at the first housing 51 (to which the busbars 65 are connected) are able to be kept in common among the multiple models.

Figure 11:
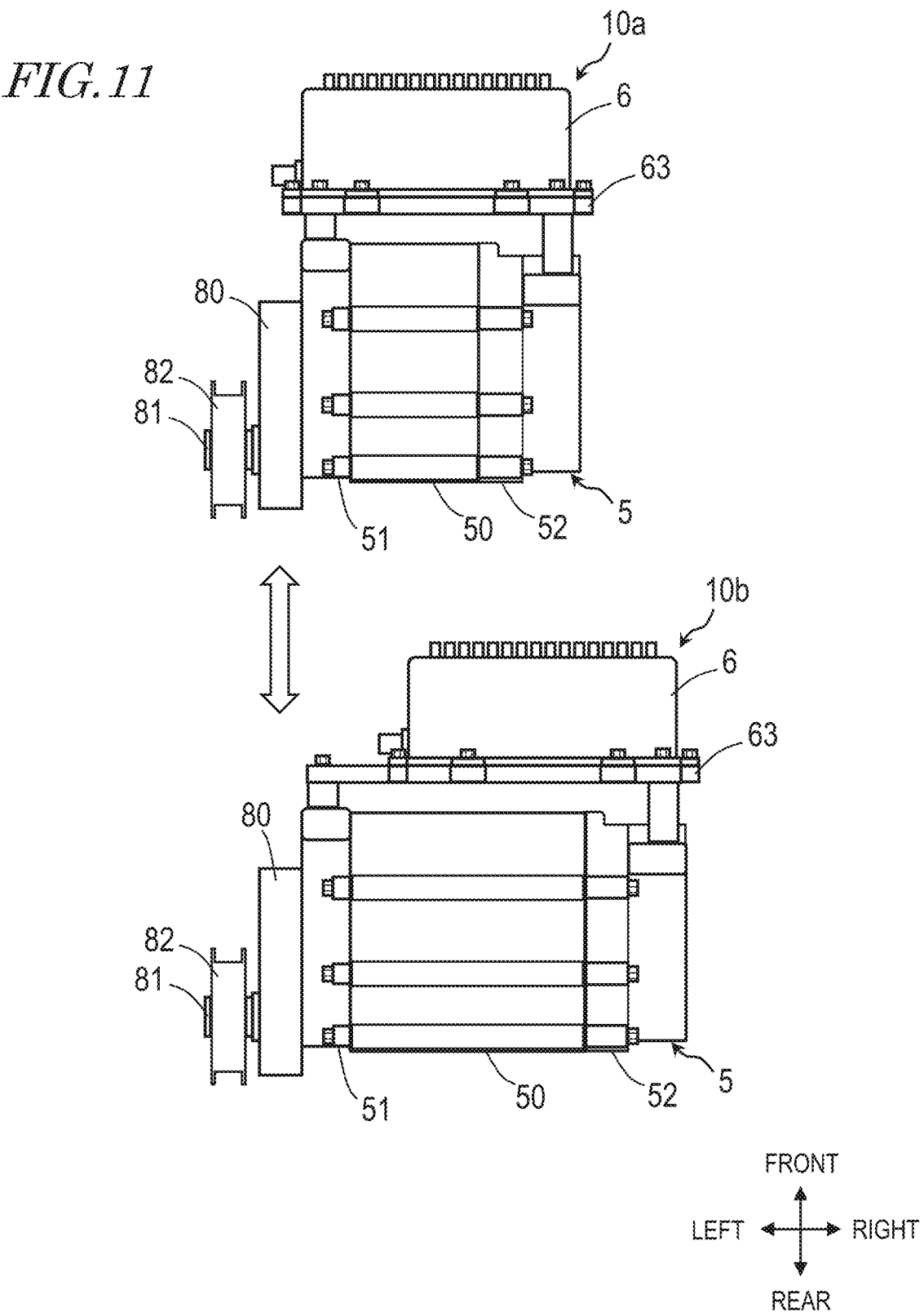
FIG. 11 is a diagram showing the drive units 10a and 10b according to a preferred embodiment of the present invention, with a speed reducer 80 attached thereto.

In the present preferred embodiment, because the first housing 51 may be used in common among multiple models, a speed reducer 80 to be attached to the first housing 51 may also be used in common among multiple models. FIG. 11 is a diagram showing the drive units 10a and 10b, with the speed reducer 80 attached thereto. The speed reducer 80 increases a torque generated by the electric motor 5, and outputs it through an output shaft 81. To the output shaft 81, for example, a pulley (drive sprocket) 82 of a belt-drive type motive power transmission mechanism is attached. Because the speed reducer 80 is provided at only one of the opposite ends of the electric motor 5, a common speed reducer 80 may be used among multiple models of the electric motor which differ in length along the rotation axis direction. The shape of the electric motor 5 at the side where the speed reducer 80 is not provided may be changed from model to model, such that the structure at the side where the speed reducer 80 is provided are able to be kept in common among the multiple models. Because common components may be used among multiple models, multiple models of the electric vehicle 1 which differ with respect to the characteristics of the electric motor 5 are easily obtained.

Figure 12:
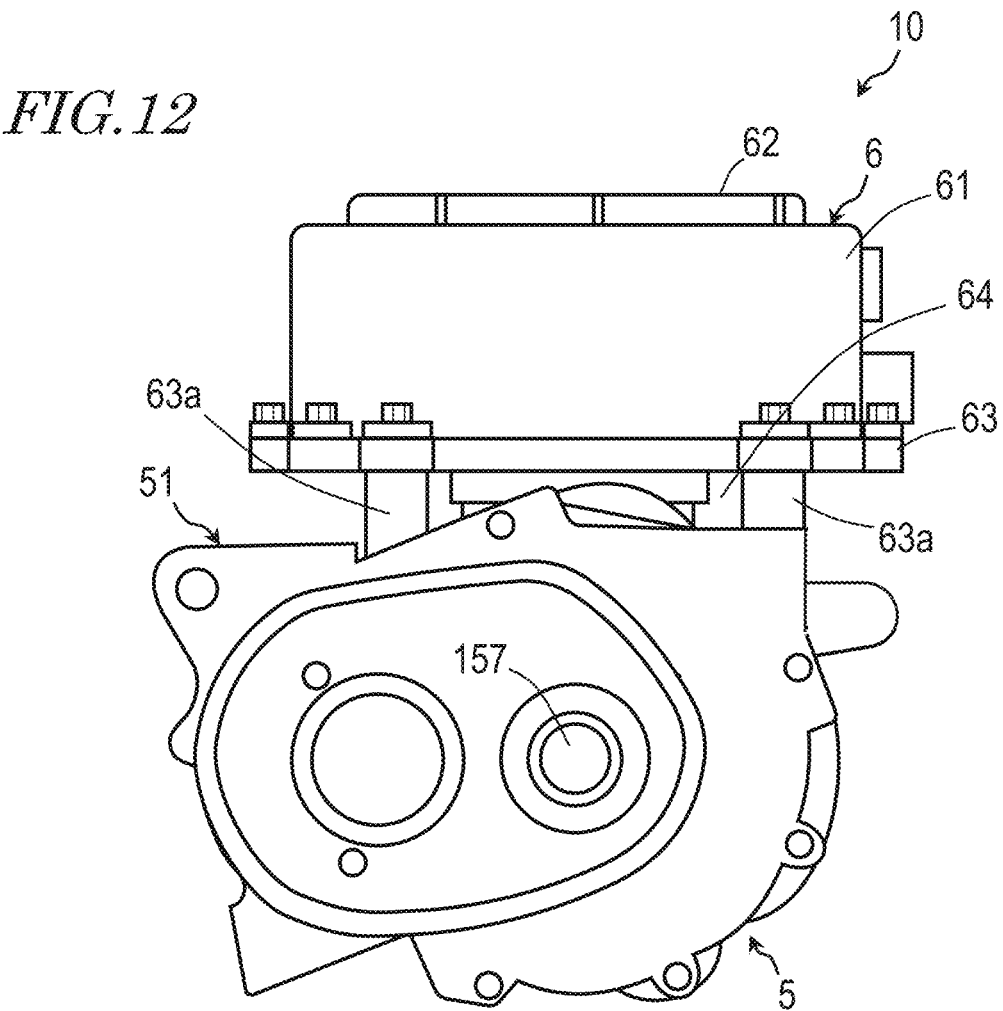
Figure 13:
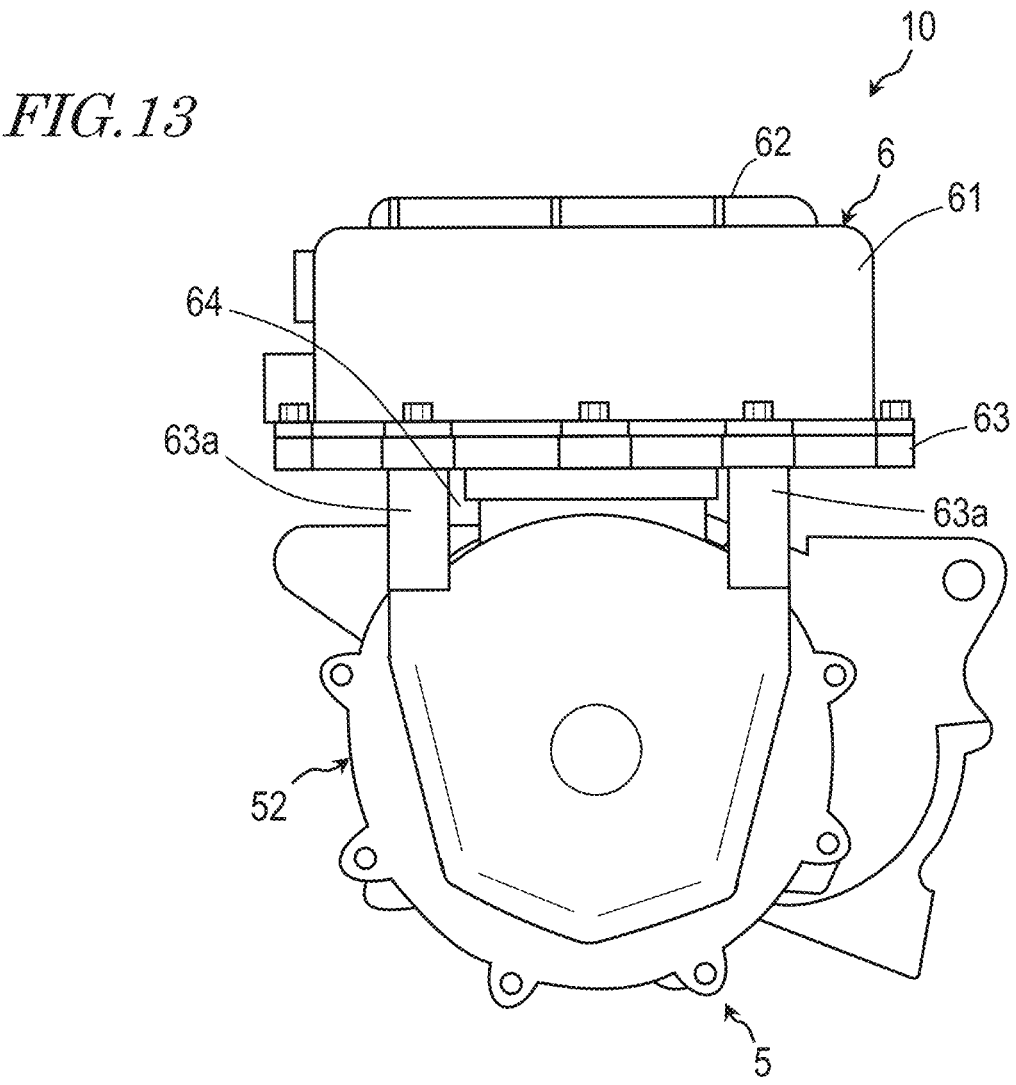
Figure 13:
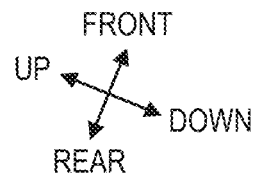

Although the above-described preferred embodiments illustrate that the bracket 63 supporting the MCU 6 is attached to the protrusion 51a of the first housing 51 and to the protrusion 52a of the second housing 52, the first housing 51 and the second housing 52 may lack such protrusions 51a and 52a. FIG. 12 is a diagram showing an electric motor 5 whose first housing 51 lacks the protrusion 51a. FIG. 13 is a diagram showing an electric motor 5 whose second housing 52 lacks the protrusion 52a. The pillars 63a of the bracket 63 may be attached to any arbitrary positions of the first housing 51 and the second housing 52. Because the bracket 63 supporting the MCU 6 is attached not to the stator case 50 but to the first housing 51 and the second housing 52, the amount of heat that is transmitted from the stator 151 to the MCU 6 is reduced.

Thus, illustrative preferred embodiments of the present invention have been described.

A drive unit 10 according to a preferred embodiment of the present invention includes an electric motor 5, an MCU 6 to supply a driving current to the electric motor 5, and a bracket 63 fixing the MCU 6 to the electric motor 5 with a gap 64 between the MCU 6 and the electric motor 5. The electric motor 5 includes a stator 151, a barrel-shaped stator case 50 accommodating the stator 151, a rotor 155 including an output shaft 157 and being located inside the stator 151, a first housing 51 including a bearing 251 that supports one side of the output shaft 157 along a rotation axis direction of the rotor 155, the first housing 51 being attached to the stator case 50 so as to cover an opening 256 at one end of the stator case 50, and a second housing 52 including a bearing 252 that supports another side of the output shaft 157 along the rotation axis direction, the second housing 52 being attached to the stator case 50 so as to cover an opening 257 at another end of the stator case 50. The bracket 63 supporting the MCU 6 is attached to the first housing 51 and the second housing 52 and not to the stator case 50.

During operation of the electric motor 5, a lot of heat is generated from the stator 151, which includes coils and iron cores. Thus, the main source of heat within the electric motor 5 is the stator 151. The heat generated from the stator 151 is mainly transmitted to the stator case 50 and released outside the electric motor 5.

The drive unit 10 according to a preferred embodiment of the present invention includes an integrated mechanical and electrical structure in which the MCU 6 is attached to the electric motor 5. The bracket 63 supporting the MCU 6 is attached to the first and second housings 51 and 52 supporting the bearings 251 and 252 and not to the stator case 50. Because the gap 64 exists between the MCU 6 and the electric motor 5 and because the MCU 6 is attached to the first and second housings 51 and 52, the amount of heat that is transmitted from the stator 151 to the MCU 6 is reduced.

The first and second housings 51 and 52 may be used in common among multiple models of the electric motor 5 which differ in length along the rotation axis direction. Changes in the size of the electric motor 5 are achieved by changing the length of the stator case 50 along the rotation axis direction. By merely changing the size of the bracket 63 in accordance with the length along the rotation axis direction of each of the multiple models, it becomes possible to realize an integrated mechanical and electrical structure in each model.

According to a preferred embodiment of the present invention, the stator case 50 may be made of a stretched material.

By varying the dimensions into which the stretched material is cut, multiple models of the electric motor 5 which differ in length along the rotation axis direction are easily obtained. It becomes possible to reduce the costs associated with producing a wide variety of products in small quantities in particular.

According to a preferred embodiment of the present invention, the drive unit 10 may further include a busbar(s) 65 through which the driving current supplied from the MCU 6 flows to the electric motor 5, wherein the busbar(s) 65 is connected to one of the first housing 51 and the second housing 52 of the electric motor 5.

Because the busbar(s) 65 is connected to only one of the opposite ends of the electric motor 5, a common connection structure for the busbars 65 may be used among multiple models of the electric motor 5 which differ in length along the rotation axis direction. The shape of the bracket 63 at the side of the electric motor 5 where the busbar(s) 65 is not connected may be changed from model to model, such that the structure at the side where the busbar(s) 65 is connected is able to be kept in common among the multiple models.

According to a preferred embodiment of the present invention, a gap 64 is provided between the MCU 6 and the stator case 50 along a direction perpendicular or substantially perpendicular to the rotation axis direction.

This allows the size of the drive unit 10 along the rotation axis direction to be reduced.

According to a preferred embodiment of the present invention, at least one of the first housing 51 or the second housing 52 may include a protrusion(s) 51a, 51b that protrudes away from the stator case 50, and the bracket 63 may be attached to the protrusion(s) 51a, 51b.

This allows the bracket 63 to be attached to the electric motor 5 at a location farther away from the stator 151, thus reducing the amount of heat that is transmitted to the MCU 6 via the bracket 63.

According to a preferred embodiment of the present invention, the drive unit 10 may further include a speed reducer 80 to increase a torque generated by the electric motor 5, and the speed reducer 80 may be provided on one of the first housing 51 and the second housing 52 of the electric motor 5.

By increasing the torque with the speed reducer 80, a large torque is able to be output. Because the speed reducer 80 is provided on only one of the opposite ends of the electric motor 5, a common speed reducer 80 may be used among multiple models of the electric motor which differ in length along the rotation axis direction. The shape of the electric motor 5 at the side where the speed reducer 80 is not provided may be changed from model to model, such that the structure at the side where the speed reducer 80 is provided is able to be kept in common among the multiple models.

An electric vehicle 1 according to a preferred embodiment of the present invention includes the above-described drive unit 10.

Thus, an electric vehicle 1 in which a reduced amount of heat is transmitted to the MCU 6 unit is realized. Moreover, multiple vehicle models which differ with respect to the size of the electric motor 5 are able to be obtained at low costs.

Preferred embodiments of the present invention are useful particularly in the field of drive units including an electric motor, and electric vehicles including such drive units.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A drive unit comprising:
an electric motor;
a controller to supply a driving current to the electric motor; and
a bracket fixing the controller to the electric motor with a gap between the controller and the electric motor; wherein the electric motor includes:
a stator;
a stator case accommodating the stator;
a rotor including an output shaft and located inside the stator;
a first housing including a bearing that supports one side of the output shaft along a rotation axis direction of the rotor, the first housing being attached to the stator case so as to cover an opening at one end of the stator case; and
a second housing including a bearing that supports another side of the output shaft along the rotation axis direction, the second housing being attached to the stator case so as to cover an opening at another end of the stator case; wherein
the bracket is only directly attached to the first housing at the one end of the stator case, only directly attached to the second housing at the another end of the stator case, and not directly attached to the stator case.

2. The drive unit of claim 1, further comprising:
a busbar through which the driving current supplied from the controller flows to the electric motor; wherein
the busbar is connected to one of the first housing and the second housing of the electric motor.

3. The drive unit of claim 1, wherein a gap is provided between the controller and the stator case along a direction perpendicular or substantially perpendicular to the rotation axis direction.

4. The drive unit of claim 1, wherein
at least one of the first housing or the second housing includes a protrusion that protrudes away from the stator case; and
the bracket is attached to the protrusion.

5. The drive unit of claim 1, further comprising:
a speed reducer to increase a torque generated by the electric motor; wherein
the speed reducer is provided on one of the first housing and the second housing of the electric motor.

6. An electric vehicle comprising:
the drive unit of claim 1.

7. A drive unit comprising:
an electric motor;
a controller to supply a driving current to the electric motor; and
a bracket fixing the controller to the electric motor with a gap between the controller and the electric motor; wherein
the electric motor includes:
a stator;
a stator case accommodating the stator;
a rotor including an output shaft and located inside the stator;
a first housing including a bearing that supports one side of the output shaft along a rotation axis direction of the rotor, the first housing being attached to the stator case so as to cover an opening at one end of the stator case; and
a second housing including a bearing that supports another side of the output shaft along the rotation axis direction, the second housing being attached to the stator case so as to cover an opening at another end of the stator case; wherein
the bracket is attached to the first housing and the second housing and not to the stator case; and
the stator case is made of a stretched material.

* * * * *